United States Patent [19]
Chang

[11] Patent Number: 5,362,127
[45] Date of Patent: Nov. 8, 1994

[54] BICYCLE SADDLE

[75] Inventor: Robert Chang, Taichung Hsien, Taiwan, Prov. of China

[73] Assignee: Kalloy Industrial Co., Ltd., Taichung Hsien, Taiwan, Prov. of China

[21] Appl. No.: 111,177

[22] Filed: Aug. 24, 1993

[51] Int. Cl.⁵ .................. B62J 1/28; A47C 7/62
[52] U.S. Cl. ..................... 297/195.1; 297/215.16; 297/452.38
[58] Field of Search ........... 297/195.1, 215.16, 452.38, 297/463

[56] References Cited

U.S. PATENT DOCUMENTS 4,093,263  6/1978  Rihm .................... 297/195.1 X

FOREIGN PATENT DOCUMENTS 2506468  8/1976  Germany ................ 297/195.1
3231305  2/1984  Germany ................ 297/195.1
3230180  5/1984  Germany ............... 297/452.38

Primary Examiner—Richard E. Gluck
Attorney, Agent, or Firm—Merchant, Gould, Smith, Edell, Welter & Schmidt

[57] ABSTRACT

A bicycle saddle has a seat body for the posterior of a rider, mechanical parts for fixedly attaching the seat body to a seat post by connecting the a lower wall of the seat body to the seat post, a base has a substantially triangular wall defining a central hole therewithin and a snapping tongue member. The central hole surrounds the seat post and the snapping tongue member extends upwardly and inwardly from the periphery of the wall of the base. The mechanical parts for attaching the bicycle saddle to the seat post are totally enclosed by the base and the seat body; thus, they are hidden from sight.

4 Claims, 4 Drawing Sheets

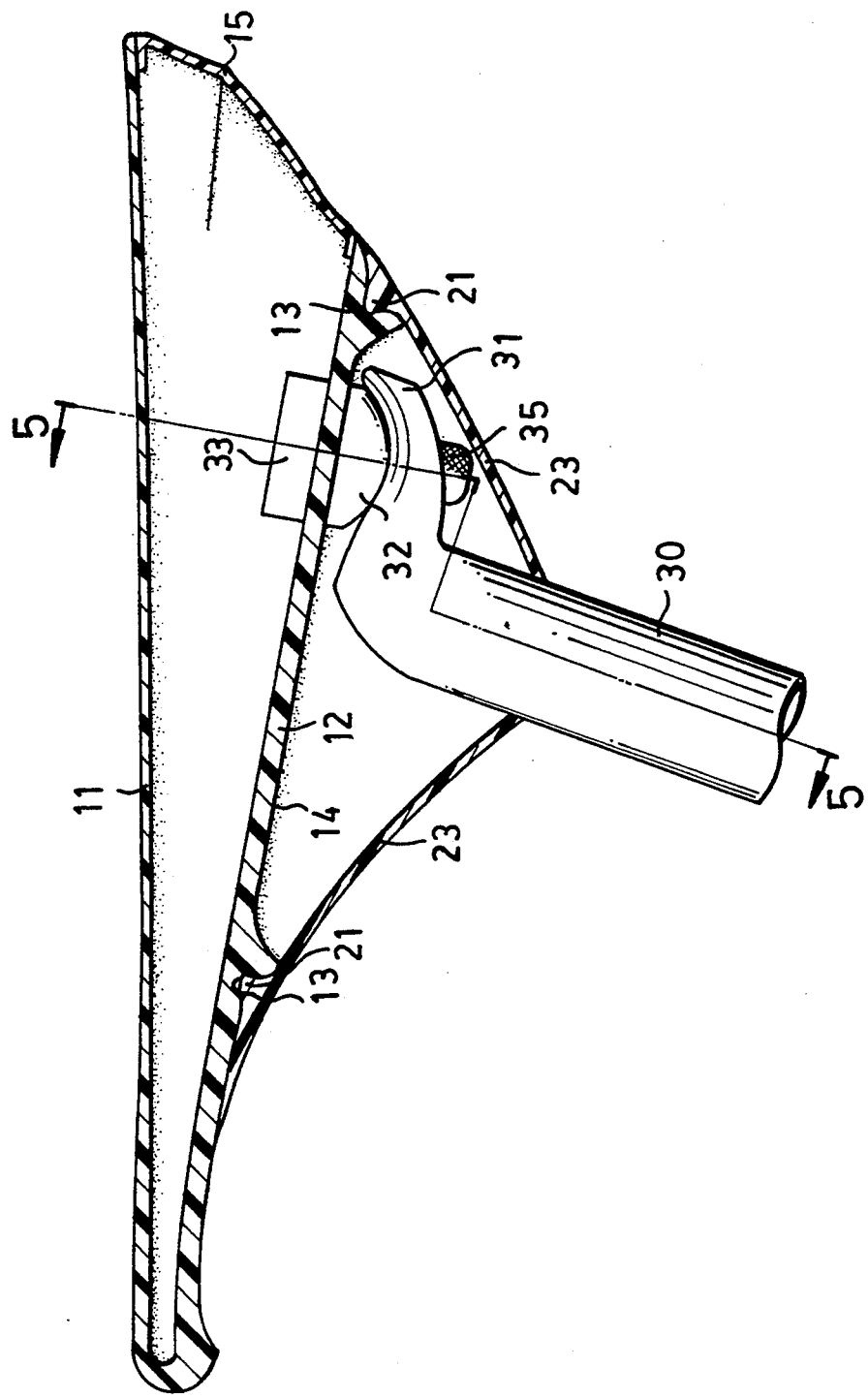

BICYCLE SADDLE

BACKGROUND OF THE INVENTION

The present invention relates to a bicycle saddle, and, more particularly, to a novel bicycle saddle which can let the bicycle have a more harmonious and attractive appearance than conventional bicycle saddles. Referring to FIG. 1 of the accompanying drawings, which shows an example of a conventional bicycle saddle. In FIG. 1, it can be seen that the conventional bicycle saddle 40 is provided with two steel bars 41 which are fixedly engaged between two mounting blocks 51 by means of a threaded bolt 52, thereby to fixedly attach the saddle 40 onto the seat post 30.

Although conventional bicycle saddles can be effectively and firmly mounted on seat posts, since presently, bicycle saddles have compact and streamlined configurations, and, particularly, the saddles of mountain climbing bicycles have a fashion to project their back portions up, most of the mechanical parts for attaching the bicycle saddles to the seat posts are visible. Such a visibility of the mechanical parts for attachment causes an aesthetically disharmonious feeling to the riders and clients who want to purchase a bicycle, since the mechanical parts for attachment often are dark in appearance and have coarse structures, which do not coordinate with the decorative and polished appearance and delicate structures of the rest of the bicycle.

SUMMARY OF THE INVENTION

To overcome the disadvantages of conventional bicycle saddles, the present invention is proposed to provide a unique bicycle saddle which totally encloses the mechanical parts for attaching the saddle to the seat post to let them be hidden from sight, whereby the bicycle equipped with the present bicycle saddle can have a more harmonious and attractive appearance.

The present invention is related to a bicycle saddle which comprises a seat body having an upper wall constructed to receive the posterior of a rider and a lower wall having a groove which is integrally formed on a bottom face of the lower wall and which has at least a portion extending about the perimeter of the bottom face, means for fixedly attaching the seat body onto a seat post by connecting the lower wall of the seat body to the seat post, and a base having a substantially triangular wall defining a central hole therewithin and a snapping tongue member extending upwardly and inwardly from the periphery of the wall. The central hole surrounds the seat post and the snapping tongue member is tightly fitted with the groove formed on the bottom face of the lower wall of the seat body. The attaching means is totally enclosed by the seat body and the base so that it is hidden from sight.

It is an object of the present invention to provide a bicycle saddle wherein the mechanical parts for attaching the bicycle saddle to the seat post are not visible.

It is a further object of the present invention to provide a bicycle saddle, whereby the bicycle equipped with the bicycle saddle can have a more harmonious and attractive appearance.

Other objects, advantages, and novel features of the invention will become more apparent from the following detailed description when taken in conjunction with the accompanying drawings.

BRIEF DESCRIPTION OF THE DRAWINGS

FIG. 4 is a lengthwise cross-sectional view taken from the line 4—4 of FIG. 2.

DETAILED DESCRIPTION OF THE PREFERRED EMBODIMENTS

Figure 1:
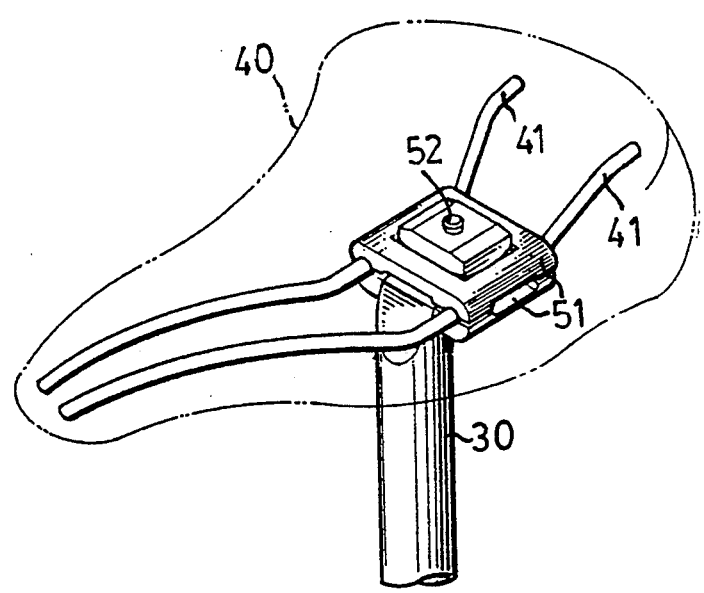
FIG. 1 is a perspective view showing an example of a conventional bicycle saddle which is attached to a seat post, wherein the saddle is presented by phantom lines.
Figure 2:
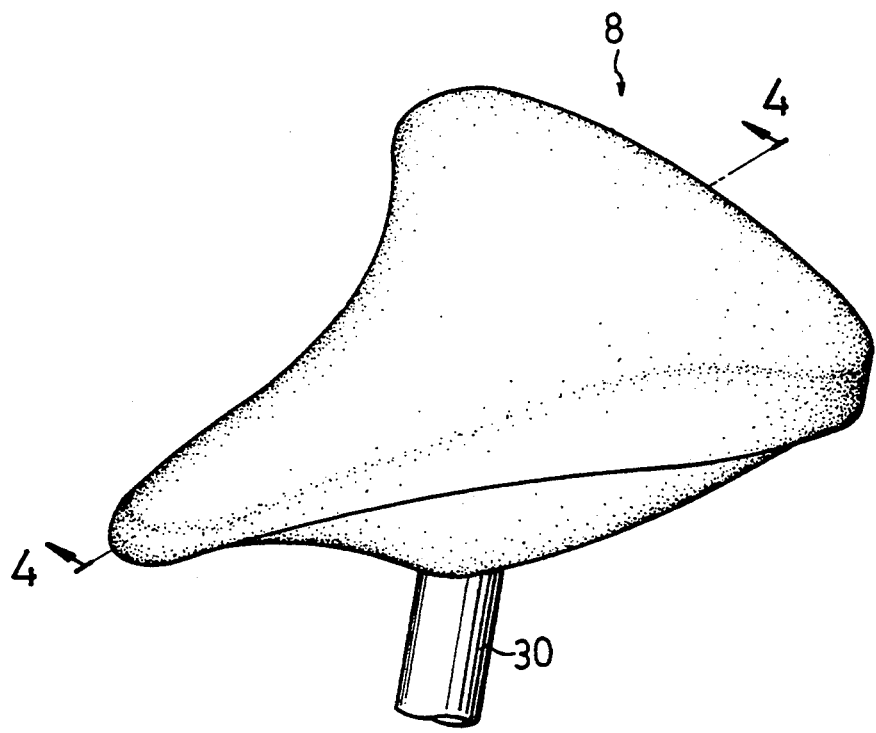
FIG. 2 is a perspective view showing the bicycle saddle of the present invention installed onto a seat post.

Referring to FIG. 2, which shows the present saddle generally indicated by reference number 8 is installed on a seat post 30.

Figure 3:
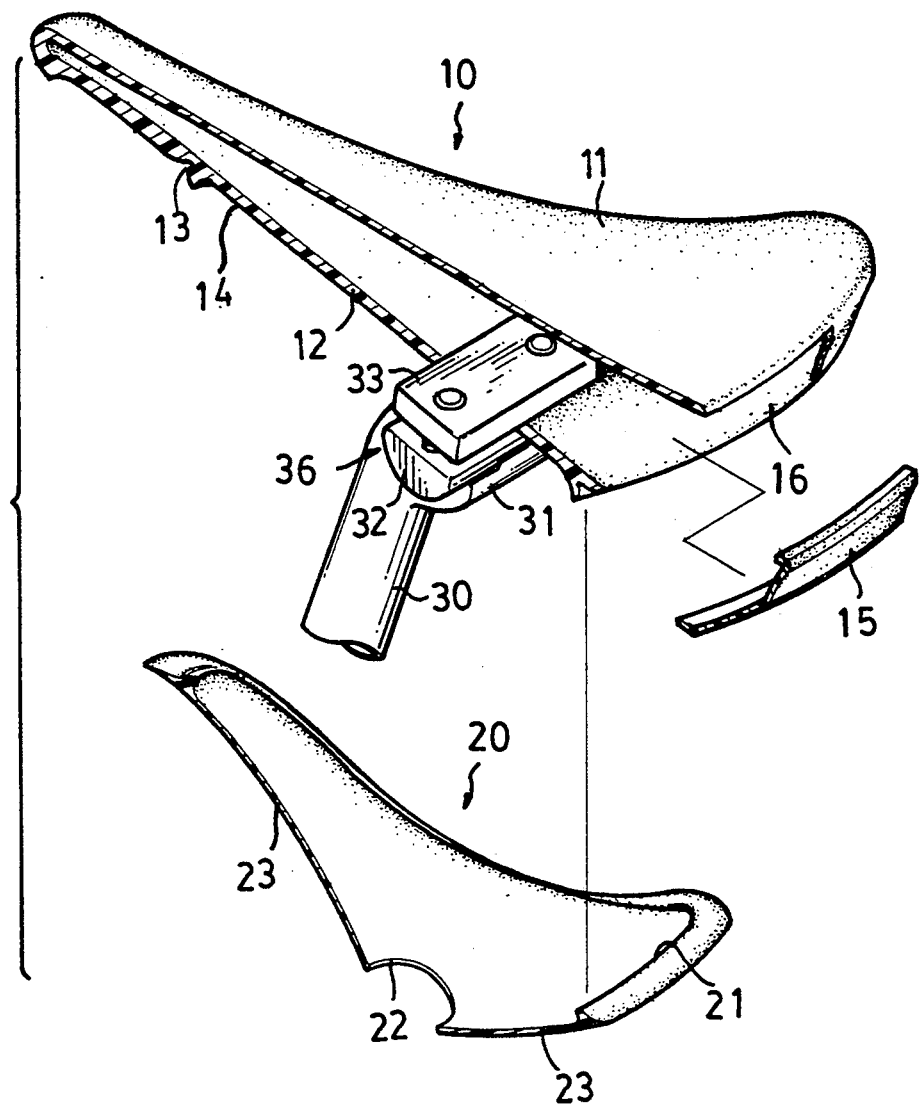
FIG. 3 is a partly perspective exploded and partly cross-sectional view showing the main components constituting the present invention.

Turning to FIG. 3, the present saddle is composed of a seat body 10, a base 20 and an attaching mechanism generally indicated in 36. The attaching mechanism 36 is used to fixedly attach the seat body 10 onto the seat post 30. The seat body 10 is composed of an upper wall 11 so configurated that a rider can comfortably sit on it, a lower wall 12 for the attachment of the seat body 10 to the seat post 30, an opening 16 provided for a worker to manipulate the attaching mechanism 36, and a plate 15 for sealingly covering the opening 16 after the seat body 10 is fixedly attached onto the seat post 30. On a bottom face 14 of the lower wall 12 of the seat body 10, there is provided a groove 13 extending generally about the perimeter of the bottom face 14. The attaching mechanism 36 shown on FIG. 3 comprises an upper mounting block 33 and a lower mounting block 32. The lower mounting block 32 is fixedly mounted onto a bracket 31 which is integrated with the seat post 30. The base 20 has a substantially triangular wall 23 defining a central hole 22 therewithin. A snapping tongue member 21 extends upwardly and inwardly from the periphery of the wall 23 of the base 20. The central hole 22 is used to surround the seat post 30 (better seen by FIG. 4).

Now please refer to FIG. 4, a lengthwise cross-sectional view taken from the line 4—4 of FIG. 2. FIG. 4 shows that the present bicycle saddle assembled and attached onto the seat post 30. The seat body 10 is attached onto the seat post 30 by the engagement of the lower wall 12 between the upper and lower mounting blocks 33 and 32, wherein the lower mounting block 32 is fixedly mounted onto the bracket 31 of the seat post 30 by a threaded bolt 35. Due to the block 32 having an arcuate bottom face received on a correspondingly contoured face of the bracket 31, it is obvious to those skilled in the art that the angle between the longitudinal axis of the seat body 10 in respect to that of the seat post 30 is adjustable.

The snapping tongue member 21 located on the base 20 is tightly fitted into the groove 13 formed on the bottom face 14 of the lower wall 12 of the seat body 10, thereby to firmly connect the base 20 with the seat body 10.

Figure 5:
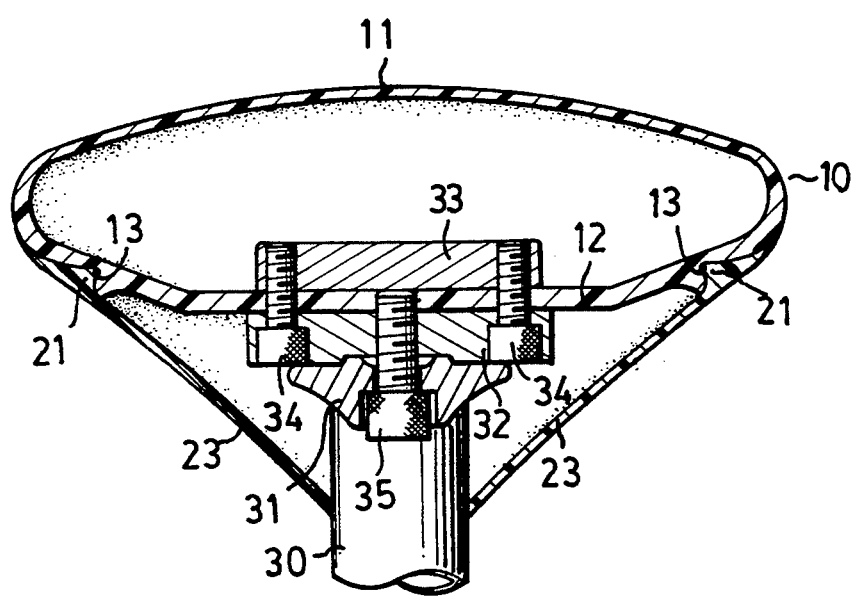
FIG. 5 is a traverse cross-sectional view taken from the line 5—5 of FIG. 4.

Finally, refer to FIG. 5, which shows in more detail the attachment of the seat body 10 onto the seat post 30. The lower mounting block 32 is fixedly mounted on the bracket 31 of the seat post 30 by threadedly engaging with the threaded bolt 35 passing through the bracket 31. The seat body 10 is fixedly attached onto the seat post 30 by two threaded bolts 34 passing through the lower mounting block 32, the lower wall 12 of the seat body 10 and threadedly engaging with the upper mounting block 33.

From FIGS. 4 and 5, it can be seen that the attaching mechanism 36 located below the lower wall 12 is hidden from sight by the presence of the wall 23 of the base 20. Moreover, the attaching mechanism 36 located above the lower wall 12 is also hidden from sight after the opening 16 is sealingly covered by the plate 15.

Although the invention has been explained in relation to its preferred embodiment, it is to be understood that many other possible modifications and variations can be made without departing from the spirit and scope of the invention as hereinafter claimed.

I claim:

1. A bicycle saddle comprising:
a seat body comprising an upper wall constructed to receive the posterior of a rider and a lower wall;
connecting means connected to the lower wall of the seat body;
means for fixedly attaching the seat body onto a seat post by attaching the lower wall of the seat body to the seat post;
a base having a substantially triangular wall defining a central hole therewithin, said substantially triangular wall connected to said connecting means and said central hole surrounding the seat post; and
said attaching means being totally enclosed by the seat body and the base so that it is hidden from sight.

2. A bicycle saddle according to claim 1, wherein said connecting means constitutes a groove and a snapping tongue member fixedly fitted into the groove, said groove being formed on a bottom face of the lower wall of the seat body and having at least a portion extending about the perimeter of the bottom face, said snapping tongue member extending upwardly and inwardly from the periphery of the substantially triangular wall of the base.

3. A bicycle saddle according to claim 1 further comprising a plate sealingly covering an opening formed on the seat body.

4. A bicycle saddle according to claim 2 further comprising a plate sealingly covering an opening formed on the seat body.

* * * * *